US006733147B2

(12) United States Patent
Wang et al.

(10) Patent No.: US 6,733,147 B2
(45) Date of Patent: May 11, 2004

(54) BACKLIGHTING SYSTEM FOR DISPLAYS

(76) Inventors: San Zhuang Wang, 22220 S. Vermont Ave., No. 102C, Torrance, CA (US) 90502; Gajendra Savant, 42 Country La., Rolling Hills Estates, CA (US) 90274; Jeffrey A. Laine, 1718 Esplanade No. 201, Redondo Beach, CA (US) 90277; Mark Bennahmias, 65 Rockview Dr., Irvine, CA (US) 92612; Rick L. Shie, 868 Gold Spring Pl., Westlake Village, CA (US) 91361

( * ) Notice: Subject to any disclaimer, the term of this patent is extended or adjusted under 35 U.S.C. 154(b) by 0 days.

(21) Appl. No.: 10/206,459

(22) Filed: Jul. 27, 2002

(65) Prior Publication Data

US 2003/0016521 A1 Jan. 23, 2003

Related U.S. Application Data

(63) Continuation-in-part of application No. 09/656,681, filed on Sep. 7, 2000.

(51) Int. Cl.[7] ............................................. G01D 11/28
(52) U.S. Cl. ............................ 362/26; 362/27; 362/31; 362/561
(58) Field of Search ................................ 362/26, 27, 31, 362/561, 223; 349/64, 65; 385/146, 133

(56) References Cited

U.S. PATENT DOCUMENTS 5,854,872 A * 12/1998 Tai .............................. 385/133
6,256,447 B1 * 7/2001 Laine .......................... 385/146
6,347,873 B1 * 2/2002 Hosseini et al. .............. 362/31
2002/0071272 A1 * 6/2002 Tenmyo ....................... 362/223

* cited by examiner

Primary Examiner—Thomas M. Sember
Assistant Examiner—Mark Tsidulko
(74) Attorney, Agent, or Firm—Leonard Tachner

(57) ABSTRACT

An LED-based backlighting system that provides excellent brightness and homogeneity suitable for high performance multi-color and high resolution portable displays such as for PDAs and cell phones. Several different but similar embodiments are disclosed. Some are suitable for use with multiple LEDs and some for use with a single LED. In a first such embodiment, multiple LEDs are located adjacent the input edge of a light pipe. The input edge contains fixed pitch grooves to propagate the LED light in a direction that is substantially angled toward the bottom surface of the light pipe along its entire area. The light pipe bottom surface also has grooves for altering the direction of the LED light toward the upper surface of the light pipe where it exits the light pipe toward a viewer. The exterior of the exit surface of the light pipe receives a light shaping diffuser (LSD) and an optical film. The diffuser acts to diffuse and distribute the exiting light at selected horizontal and vertical angles and the optical film shapes. In a second embodiment, a second LSD is positioned above the optical film. In a third embodiment, an LSD strip having a foreshortened LSD is positioned below the light pipe adjacent the input edge to better reduce hot spots near the LEDs.

25 Claims, 14 Drawing Sheets

FIXED DIFFUSER (CONST. ANGLES)

60° X 0.5°

60° X 0.5°

60° X 0.5°

VARIABLE DIFFUSER (DIFF. ANGLES)

5° X 0.5°
15° X 0.5°
25° X 0.5°
35° X 0.5°
40° X 0.5°
50° X 0.5°
60° X 0.5°

BACKLIGHTING SYSTEM FOR DISPLAYS

CROSS REFERENCE TO RELATED APPLICATIONS

This application is a continuation-in-part of U.S. patent application Ser. No. 09/656,681 filed on Sep. 7, 2000.

FIELD OF THE INVENTION

The present invention is directed to backlighting systems and more particularly to high brightness homogeneous intensity backlighting systems for use with one or more light source such as light emitting diodes, fluorescent lamps and lasers.

BACKGROUND OF THE INVENTION

DESCRIPTION OF RELATED ART

Backlighting systems are presently employed for a variety of display purposes such as for personal digital assistants (PDAs), car audio components, displays and illumination and cell phones. Backlighting increases the effectiveness of a display by better contrasting display graphics against a brighter background. Performance of a backlighting system is based upon criteria including brightness, apparent homogeneous light distribution, directional viewing zones and power usage. The latter characteristic is especially important in portable, battery-operated applications such as PDAs and cell phone displays where power usage directly affects battery life. As displays for PDAs and cell phones become more exotic with the addition of multi-color graphics and better resolution, the need for high brightness, homogeneous and lower power usage backlighting systems has become more extreme.

Typical prior art backlighting systems employ a bright light source such as a fluorescent lamp. Unfortunately, such lamps require complex optical couplers to direct the light in only a desired direction such as into a light pipe or optical wave guide exhibiting total internal reflection (TIR). Such lamps also suffer the disadvantages of relatively high power usage, low durability and short life span and lose energy at a rate of 1% per 100 hours of usage. In addition, it is often difficult to couple the light to the light pipe without creating dark zones or lines which detract from the desired homogeneity of the backlighting and the aesthetics of the display.

It would therefore be highly desirable to provide a backlighting system which provides solutions to these disadvantages by overcoming the conventional coupling requirements, dark zones, high power usage and life span limitations of the prior art.

SUMMARY OF THE INVENTION

The preferred embodiment of the present invention comprises an LED-based backlighting system that provides excellent brightness and homogeneity suitable for high performance multi-color and high resolution portable displays such as for PDAs and cell phones. The invention herein is also advantageous for use with other light source fluorescent lamps, as well as coherent and non-coherent light. Several different but similar embodiments are disclosed. Some are suitable for use with multiple LEDs and some for use with a single LED and some with fluorescent and other light sources. Each exhibits superior brightness and each solves the problem of hot spots or dark areas that can detract from achieving a homogeneous distribution of light intensity over the entire backlight region. Moreover, because each such embodiment is specifically designed to operate with one or more LEDs as a light source, no coupler is required, life span is greater, durability is greater and power usage is reduced.

In a first such embodiment, multiple LEDs are located adjacent the input edge of a light pipe. The input edge contains fixed pitch grooves to propagate the LED light in a direction that is substantially angled toward the bottom surface of the light pipe along its entire area. The light pipe bottom surface may have grooves for altering the direction of the LED light toward the upper surface of the light pipe where it exits the light pipe toward a viewer. The light pipe bottom surface may also be formed from silk screen dot patterns or a holographic surface structure. The exterior of the exit surface of the light pipe receives a light shaping diffuser (LSD) and other diffuser or optical film. The diffuser acts to diffuse and distribute the exiting light at selected horizontal and vertical angles and the optical film shapes the light intensity distribution to achieve optimum brightness toward the viewer.

In a second embodiment, a second LSD is positioned above the optical film. In a third embodiment, an LSD strip comprising a foreshortened LSD is positioned below the light pipe adjacent the input edge to better reduce hot spots near the LEDs. In a fourth embodiment a second LSD below and contiguous to the light pipe is used instead of the aforementioned bottom surface grooves. In a fifth embodiment a small LSD replaces the fixed grooves at the input edge. In a sixth embodiment where only one LED is employed at an input corner of a grooved light pipe, a fixed angle or variable angle LSD is used at the upper surface of the light pipe. In-a seventh embodiment, which is also a single LED version, a second fixed angle LSD is added above the variable LSD of the sixth embodiment. Such LSD may also be injection molded as an integral part of the backlight optical film. The light pipe of the sixth and seventh embodiments employs circular-shaped grooves. An important feature of the light shaping diffusers of the present invention is their directionality, controlled scattering, homogeneous characteristic and seamless variation of diffuser angle which promotes a homogeneous backlight distribution without disruptive lines.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
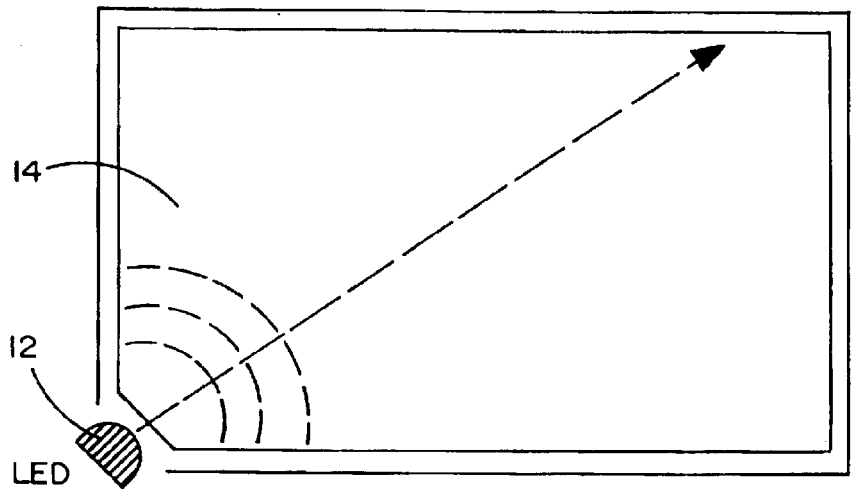
FIG. 1 is a top view of a single LED version of the present invention.
Figure 2:
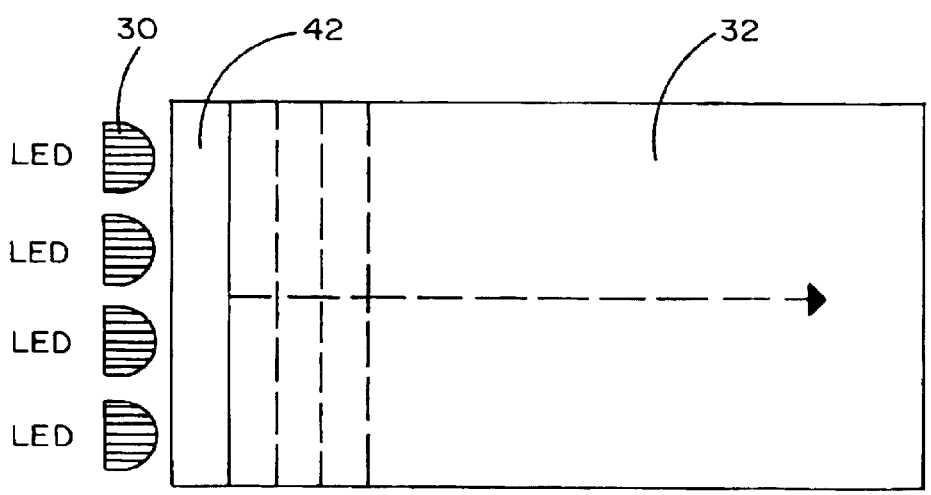
FIG. 2 is a top view of a multiple LED version.

Referring to the accompanying drawings and FIGS. 1 and 2 in particular, it will be seen that top views of two basic embodiments of the invention are shown therein. In the corner-lit backlight embodiment of FIG. 1, a single LED 12 is located at a corner of a light pipe 14 and propagates light diagonally through the light pipe. Circular anamorphic grooves located on the bottom surface of light pipe 14, run the full length of the viewing diagonal. A reflective film rests on the exterior of bottom surface and a wave-type light shaping diffuser rests on the upper surface of the light pipe.

In the edge-lit backlight embodiment of FIG. 2, a plurality of LEDs 30 are positioned adjacent a light pipe 32, the latter having linear anamorphic grooves on the bottom face and which run the length of the light pipe. A small patch of foreshortened diffuser is positioned adjacent the input edge of the light pipe below bottom face. A reflective film and a diffuser complete the structure, the diffuser resting on the upper surface of the light pipe. The diffuser structure can be of a constant or variable characteristic. Foreshortened diffuser 42 serves to help eliminate hot spots and irregularities at the light pipe regions immediately adjacent the LEDs by spreading light more evenly where otherwise alternating bright and dark spots may occur. The grooves commence beyond the foreshortened diffuser to give effect to the diffuser.

Figure 3:
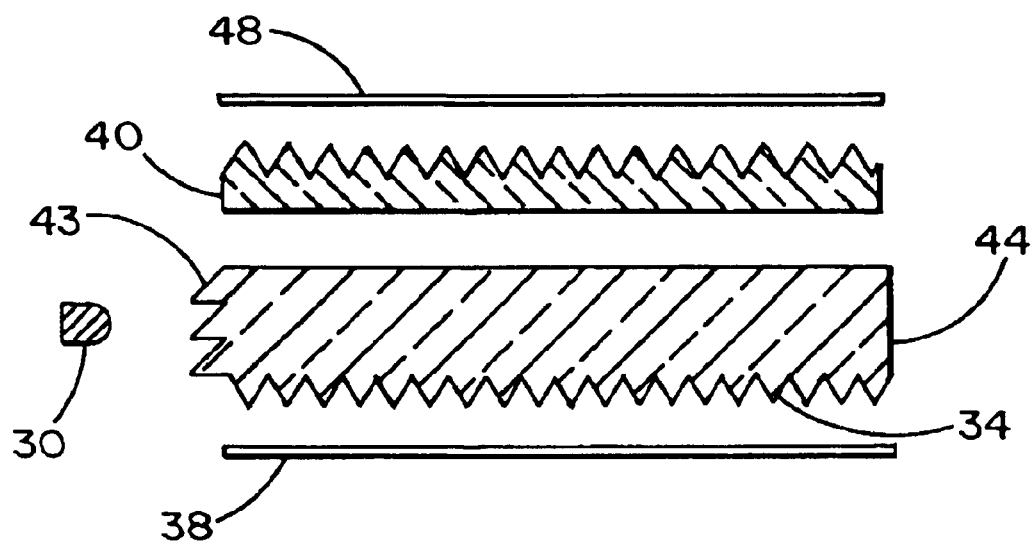
FIG. 3 is an exploded side view of a first embodiment.
Figure 4:
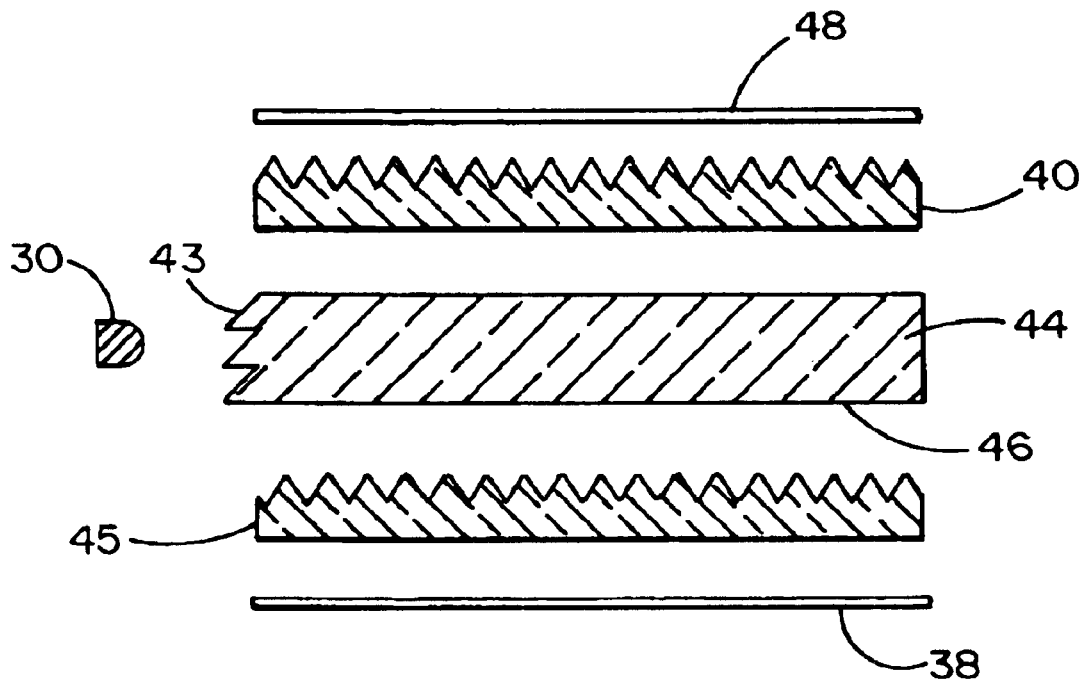
FIG. 4 is an exploded side view of a second embodiment.
Figure 5:
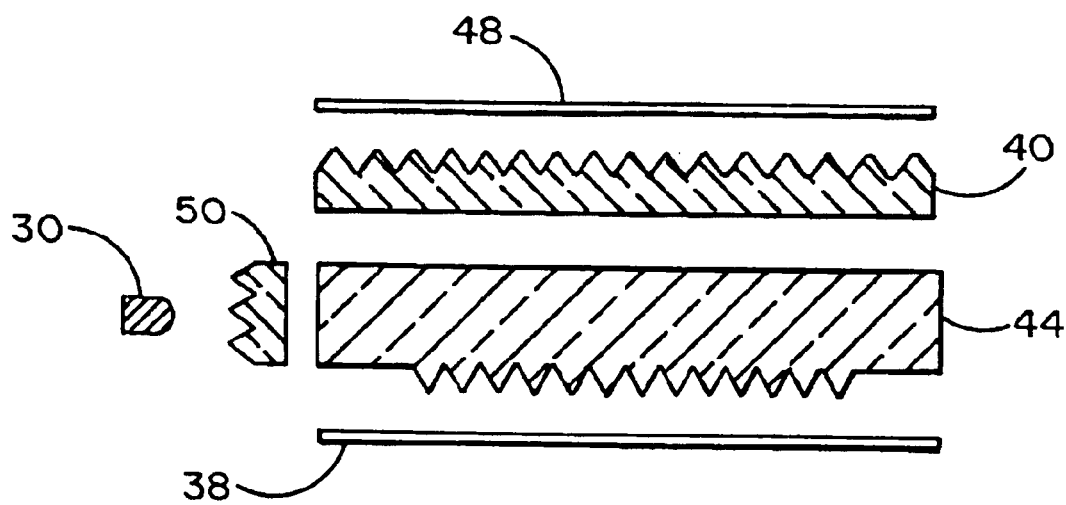
FIG. 5 is an exploded side view of a third embodiment.
Figure 6:
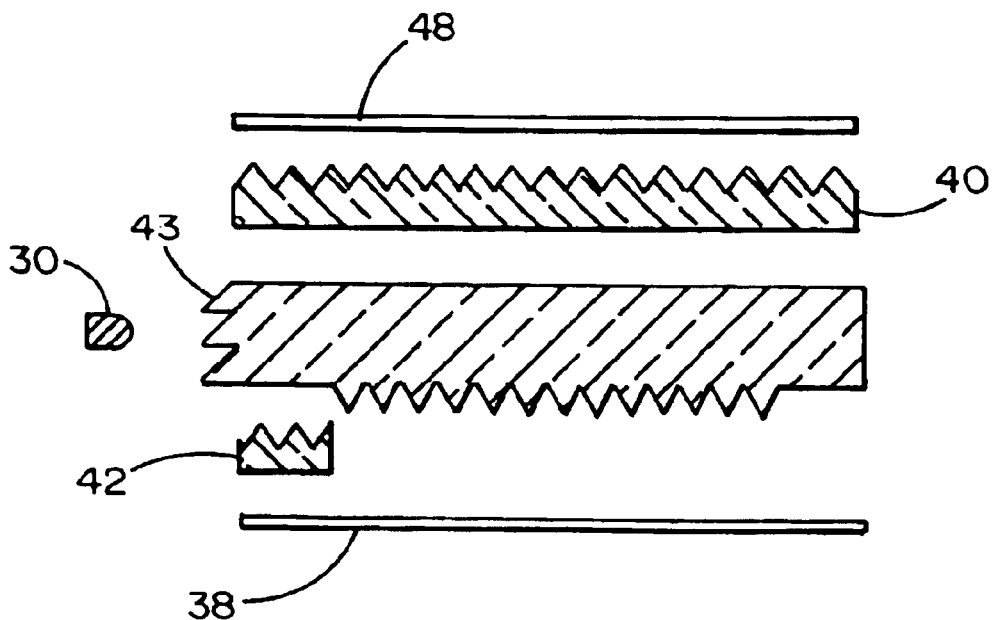
FIG. 6 is an exploded side view of a fourth embodiment.
Figure 7:
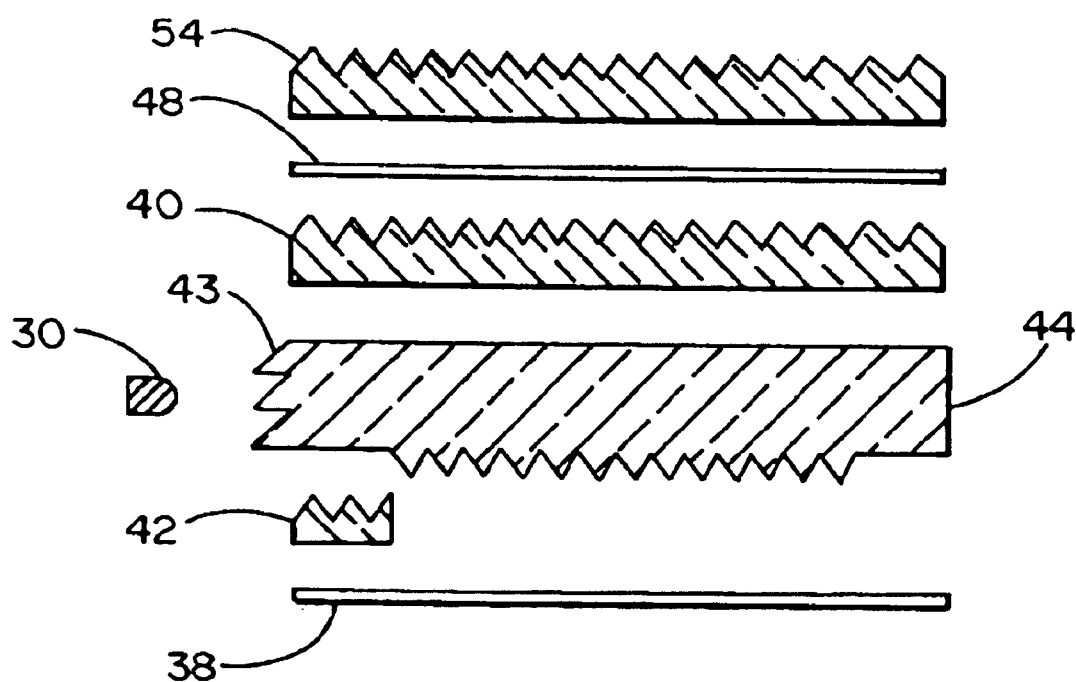
FIG. 7 is an exploded side view of a fifth embodiment.

FIG. 3 shows a version of the multiple LED embodiment of FIG. 2. In FIG. 3 we see a basic version similar to that of FIG. 2, but without a foreshortened diffuser below the light pipe 44. The principal variable of the version shown in FIG. 3 are the angular characteristics of the LSD 40 in or on light pipe 44. Each uses a constant angle LSD of angle range 10° to 80° in one direction (major) and an angle range of 0.2° to 10° in an orthogonal direction (minor). The reflector 38 is a thin film coated with silver or other highly reflective metal. Optical film 48 is, for example, a rayon optical film sold by Mitsubishi of Japan. Input grooves 43 may be employed to propagate the LED light into the light pipe 44. In the version of FIG. 4, the grooves 34 are omitted from the light pipe 44 and instead a second LSD layer 45 is positioned immediately below the smooth bottom face 46. LSD 45 provides a bending and collimating effect to re-distribute the LED light toward LSD 40 and optical film 48. The version of FIG. 5 is similar to that of FIG. 3, but an input LSD 50 is used in place of grooves 43 of FIG. 3. FIG. 6 shows the FIG. 2 version with no modification. FIG. 7 illustrates the addition of a second full LSD layer 54 above the optical film 48. The embodiment of FIG. 7 has shown the most average brightness as compared to each of the other embodiments and would therefore constitute the currently contemplated "best mode" of the invention for use with multiple LEDs. Each full length LSD of the FIG. 6 and FIG. 7 embodiments may also comprise a diffuser angle which varies over the length of the diffuser as will be described hereinafter in conjunction with FIGS. 11–13.

Figure 8:
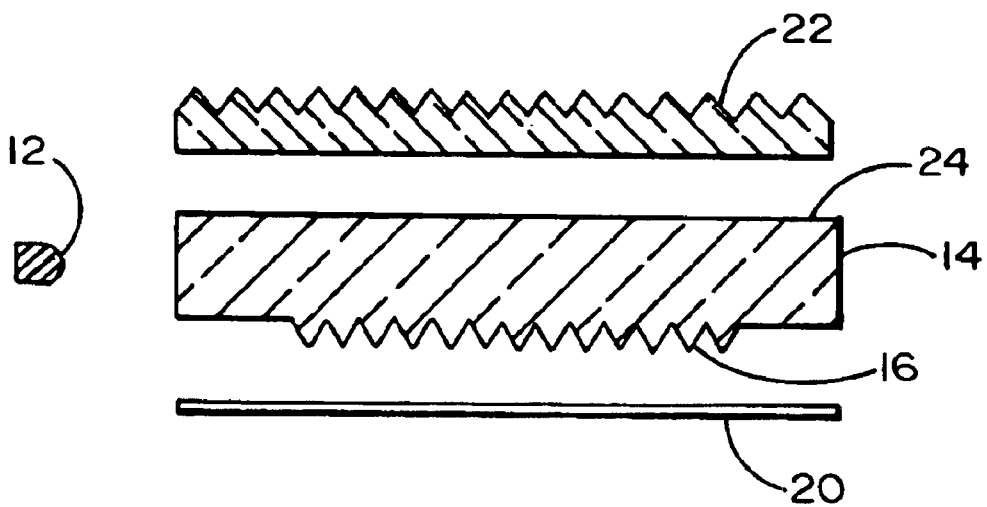
FIG. 8 is an exploded side view of a sixth embodiment.
Figure 9:
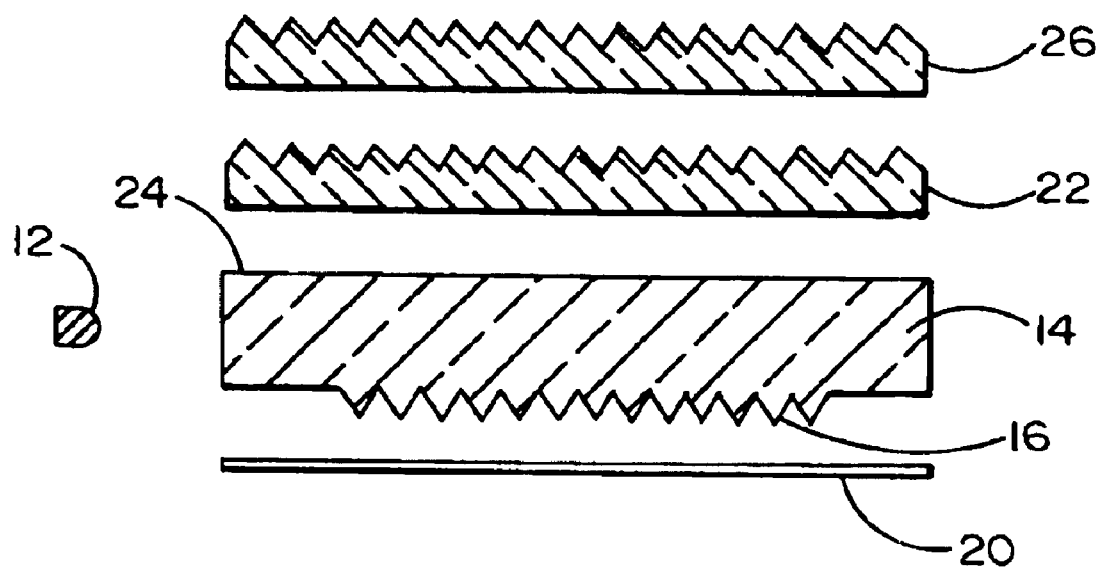
FIG. 9 is an exploded side view of a seventh embodiment.

FIGS. 8 and 9 illustrate single diode corner-lit backlight assemblies such as shown in FIG. 1. The version of FIG. 8 uses a single LSD 22 having a variable diffuser angle of 30°×1° to 65°×10. The version of FIG. 9 adds a fixed angle full length LSD 26 of 3° major diffuser angle. Each variable diffuser is preferably of circular angle variation shown for example in FIGS. 15–19, while the fixed angle LSD of FIG. 9 has the circular configuration of FIG. 14. Other diffuser angles are contemplated. Each of the embodiments of FIGS. 8 and 9 employs a reflector 20.

Other embodiments of the invention are contemplated. By way of example, LSD's that are located on the light pipe, may instead be made an integral surface structure of the light pipe. Furthermore, grooves 34 may instead be a diffuser, a dot matrix structure or a silk screen structure, in whole or in part.

Figure 10:
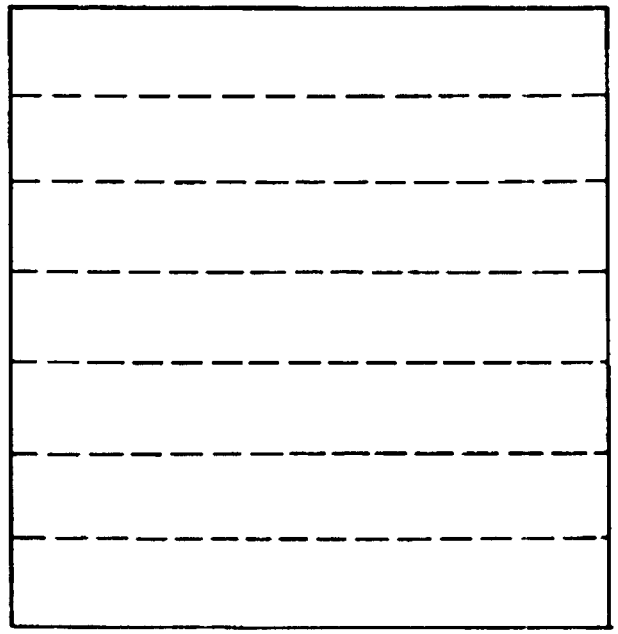
FIG. 10 is a simplified diagram of a fixed angle rectangular diffuser surface having constant diffusion angle.

Attention will now be directed to FIGS. 10–19 which illustrate a variety of diffuser configurations which can be used beneficially in a backlighting system in accordance with the present invention. FIG. 10 illustrates a generally rectangular diffuser having constant diffusion angles throughout its surface. In the example illustrated, that diffuser angle is 60° in one direction (i.e., major) and 0.5° in another direction (i.e., minor). Other diffuser angles may also be used depending upon desired light distribution.

Figure 11:
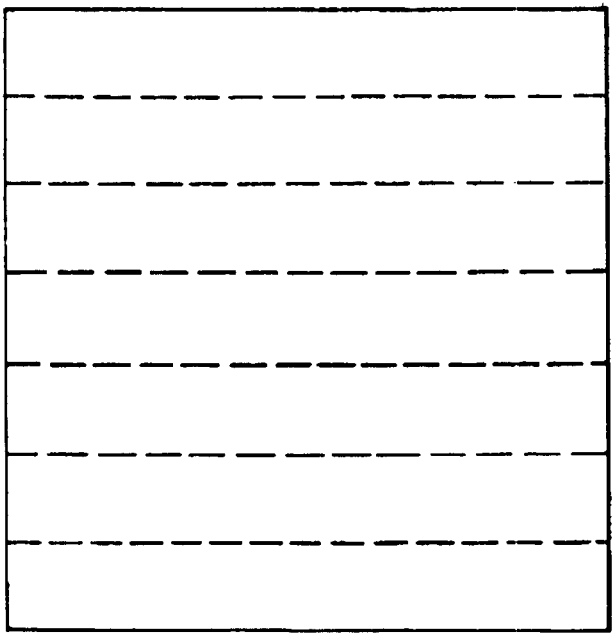
FIG. 11 is a simplified diagram of a variable rectangular diffuser surface having variable diffuser angle.
Figure 12:
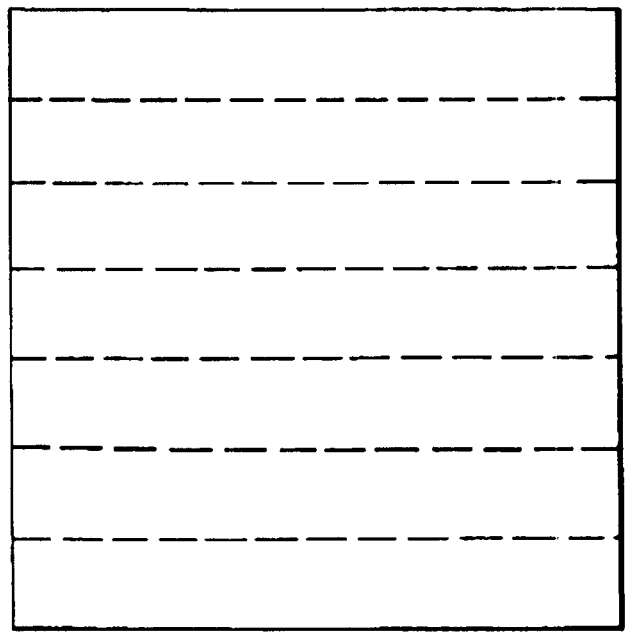
FIG. 12 is similar to FIG. 11, but showing another diffusion angle variation.
Figure 13:
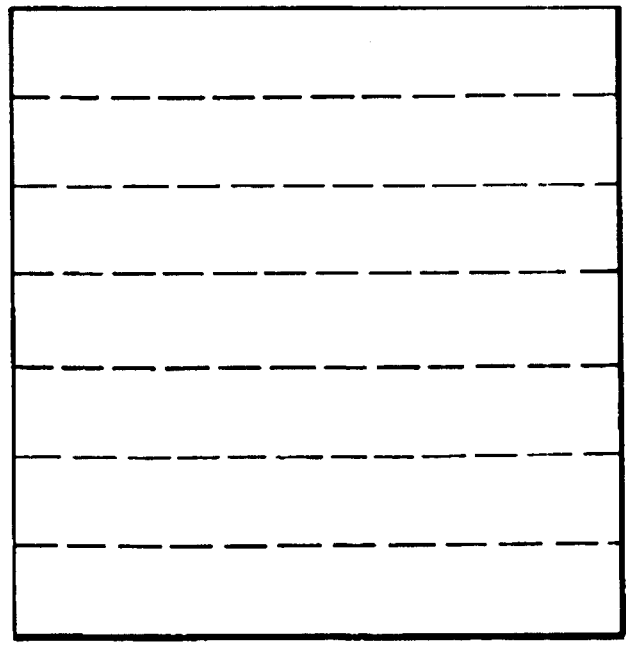
FIG. 13 is also similar to FIG. 11, but showing still another diffusion angle variation.
Figure 14:
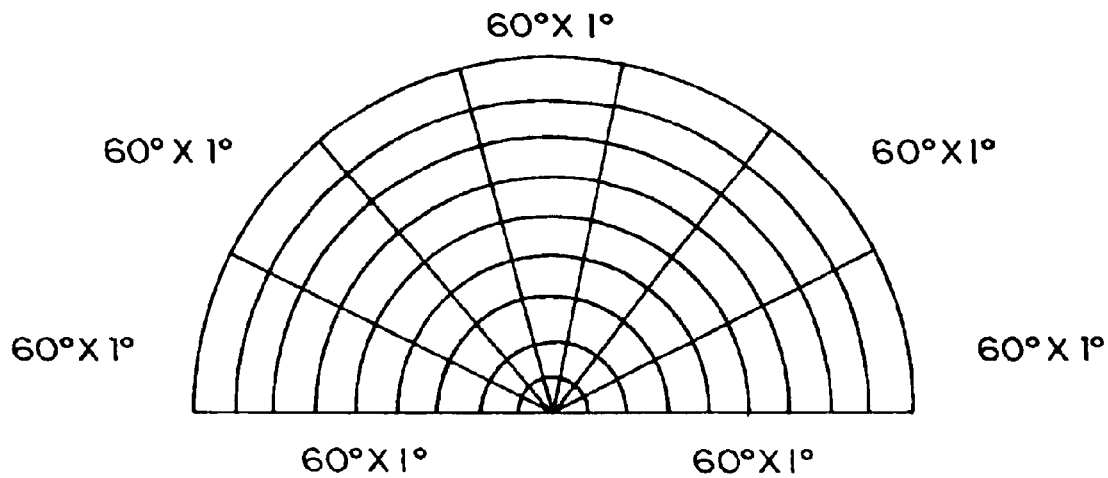
FIG. 14 is a simplified diagram of a fixed angle semi-circular diffuser surface having constant diffuser angle.
Figure 15:
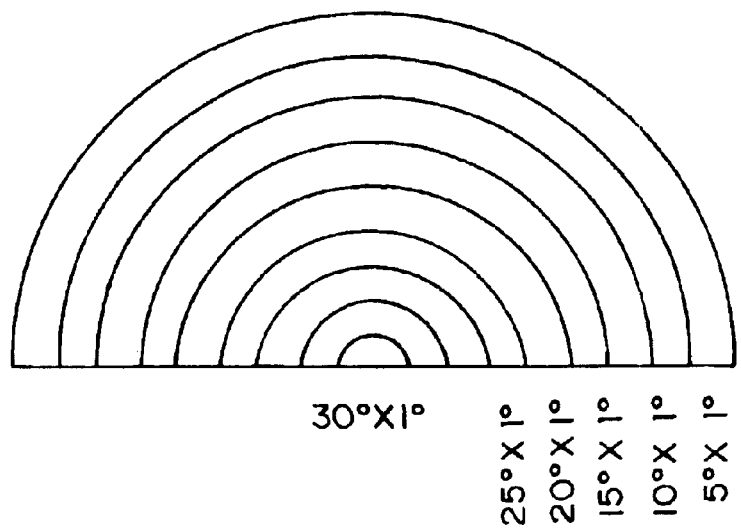
FIG. 15 is a simplified diagram of a variable semi-circular diffuser surface having variable diffuser angle in different radii or radial segments.
Figure 16:
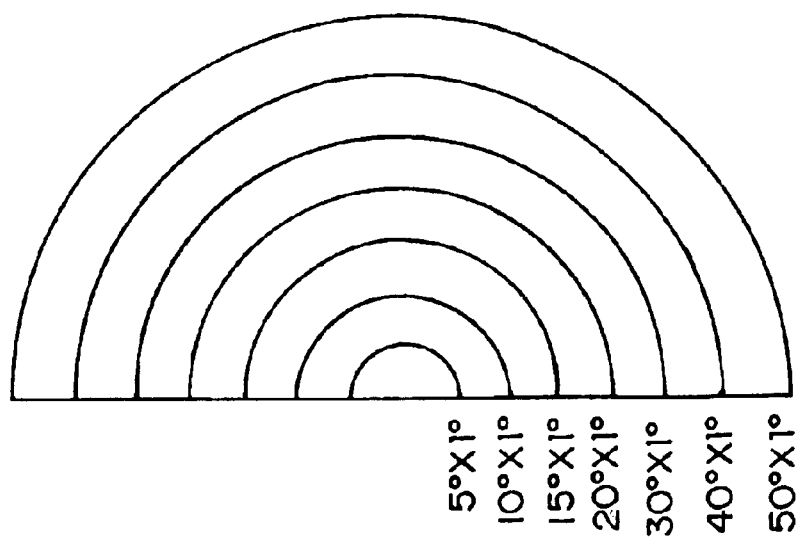
FIG. 16 is similar to FIG. 15, but showing another diffusion angle variation.

The rectangular diffuser of FIGS. 11–13 are each variable in that the diffuser angle changes along the length of the diffuser. For example, the version shown in FIG. 11 has a gradual incremental increase in the major diffusion angle from 5° at about its mid-section and incrementally increases to 60° at both ends. The diffuser of FIG. 13 has a 60° major diffuser angle at its mid-section and the angle decreases incrementally to 5° at both ends. FIG. 14 illustrates a semi-circular-shaped diffuser of fixed diffuser angle (i.e., 60°×1°) throughout its entire surface. FIG. 15 shows an example of a variable angle semi-circular diffuser where the diffuser is configured with discrete radial segments each having a particular diffusion angle. In the illustrated embodiment of FIG. 15, the diffuser angle at the center segment is 30°×1°, but it decreases incrementally to 5°×1° at the outermost radial segment. FIG. 16 shows a similar diffuser configuration but with a 5°×1° center segment and a 50°×1° outermost segment. Each of the major and minor angles shown herein are only illustrative and may be virtually any selected angle.

Figure 17:
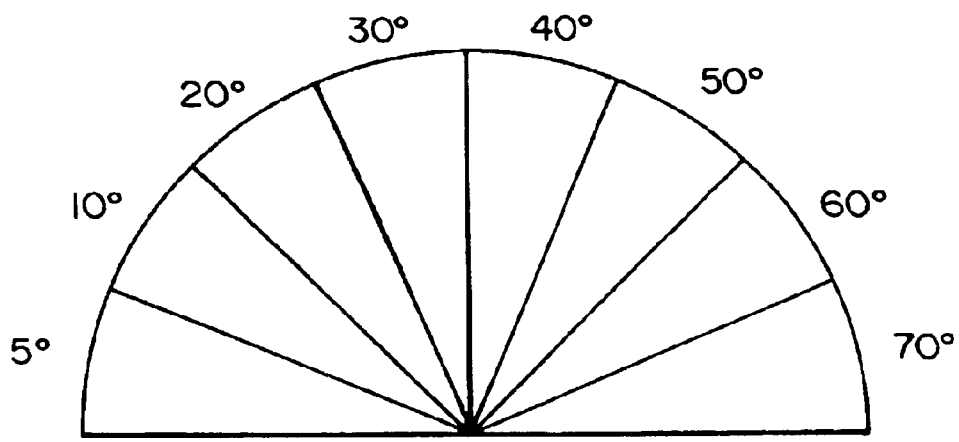
FIG. 17 is a simplified diagram of a variable semi-circular diffuser surface having variable diffuser angle in distinct angular segments.
Figure 18:
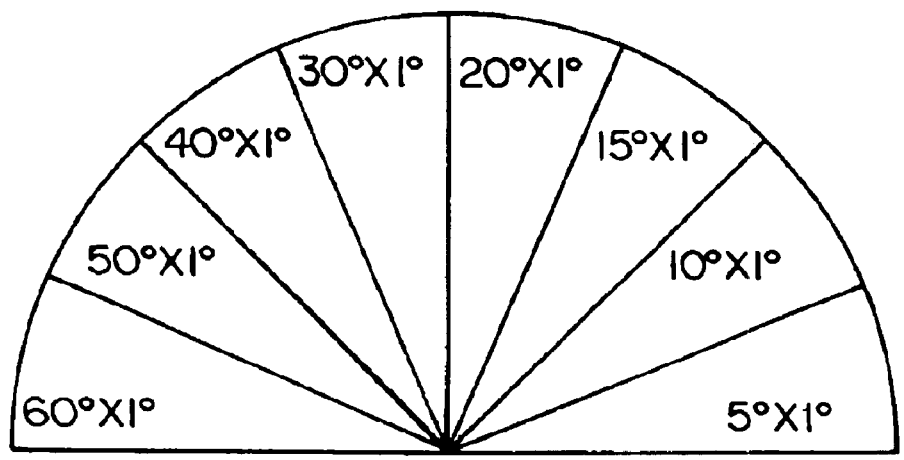
FIG. 18 is similar to FIG. 17, but showing another diffusion angle variation.
Figure 19:
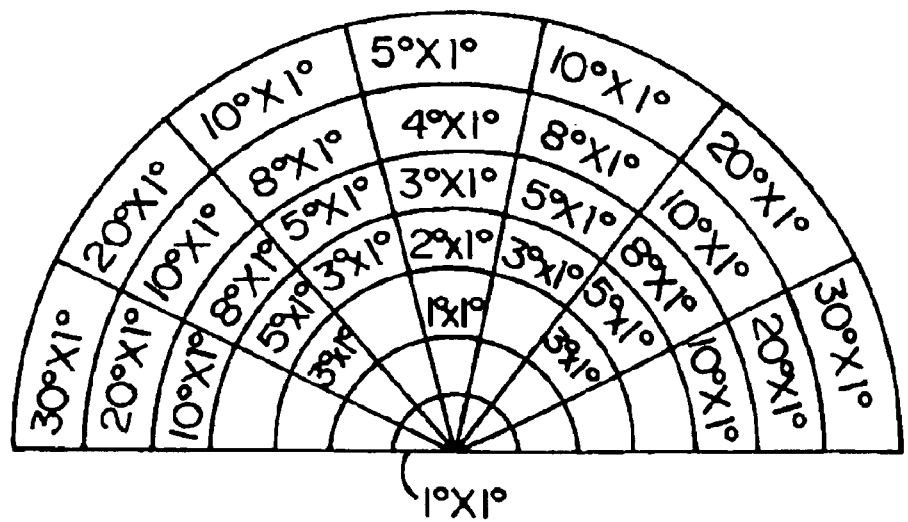
FIG. 19 is a version similar to both FIGS. 15 and 17, but having variable diffuser angle both at different radii and in distinct segments.

Diffuser angle variation in a semi-circular or full circle diffuser can also be configured to occur in discrete angular segments as shown in FIGS. 17 and 18. In FIG. 17, there is a 5° angular segment at the left-most position and a 70° angular segment at the right-most position with discrete diffuser angle increases from left to right. FIG. 18 illustrates the same type of diffuser angle variation in angular segments, but in the opposite direction. FIG. 19 illustrates another circular diffuser variation in both radial and angular segments where the diffuser angle is 30°×1° at the outermost angular and radial segments, but decreases to 10°×1° at the center radial segment.

Figure 20:
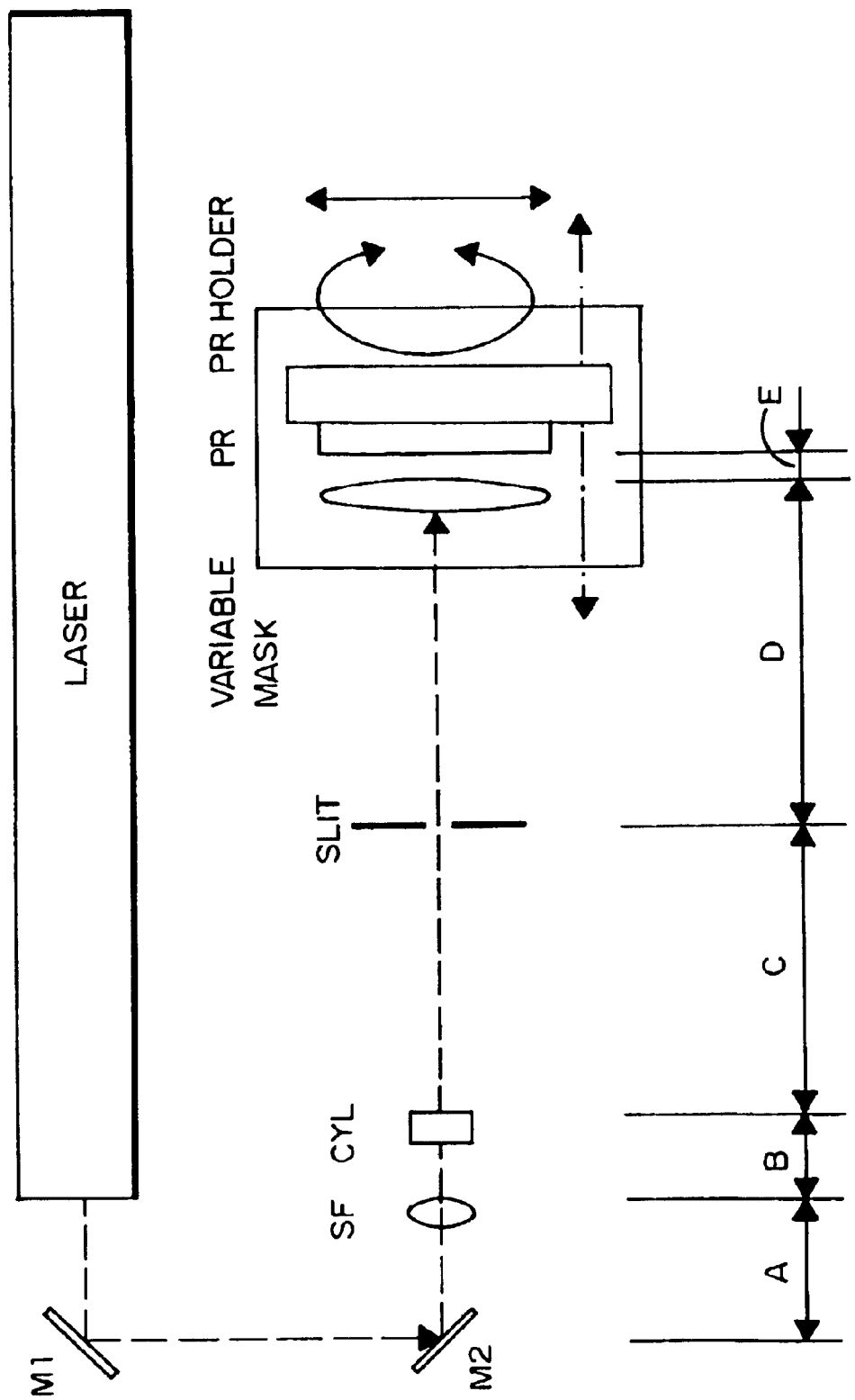
FIG. 20 is a block diagram of a fabrication apparatus for fabricating variable diffusers.
Figure 21:
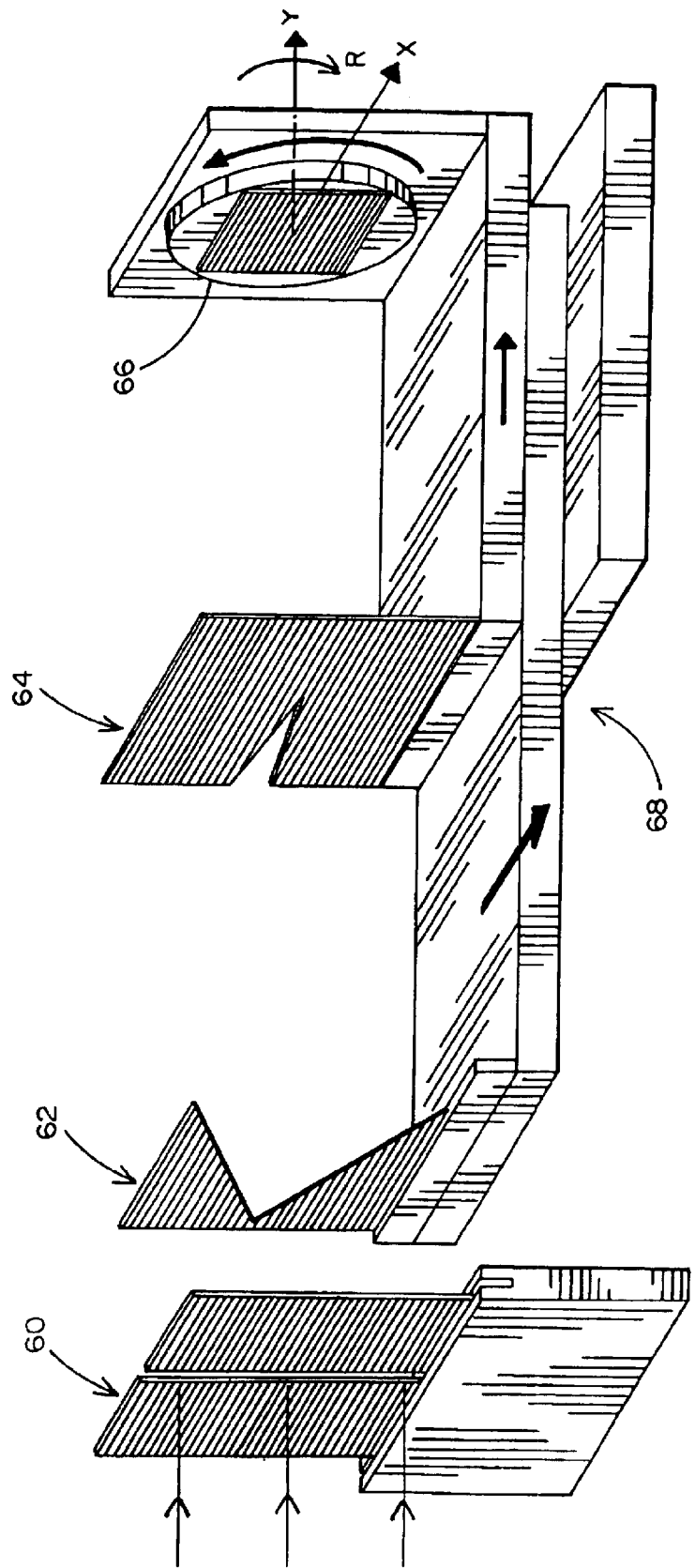
FIGS. 21–23 illustrate various configurations of the apparatus of FIG. 20 for generating diffuser masters of different diffuser angles.
Figure 22:
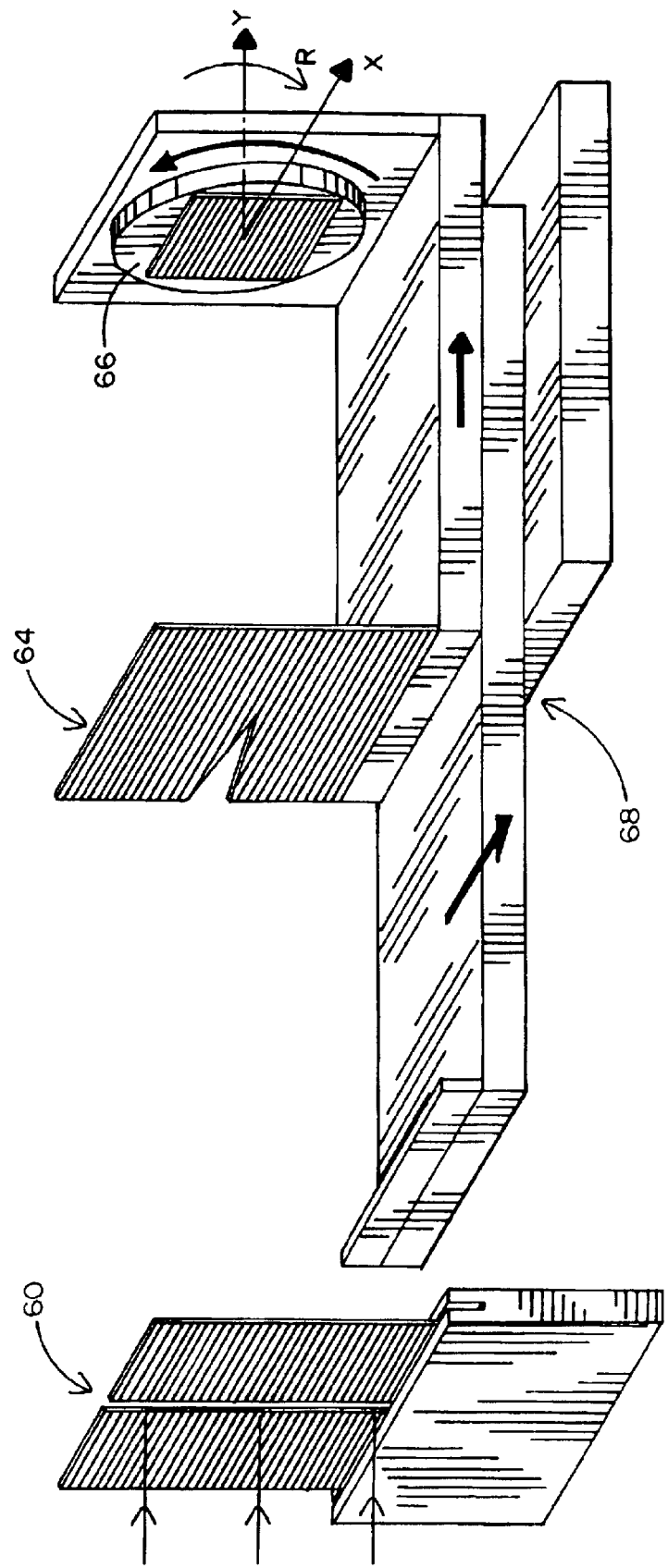
Figure 23:
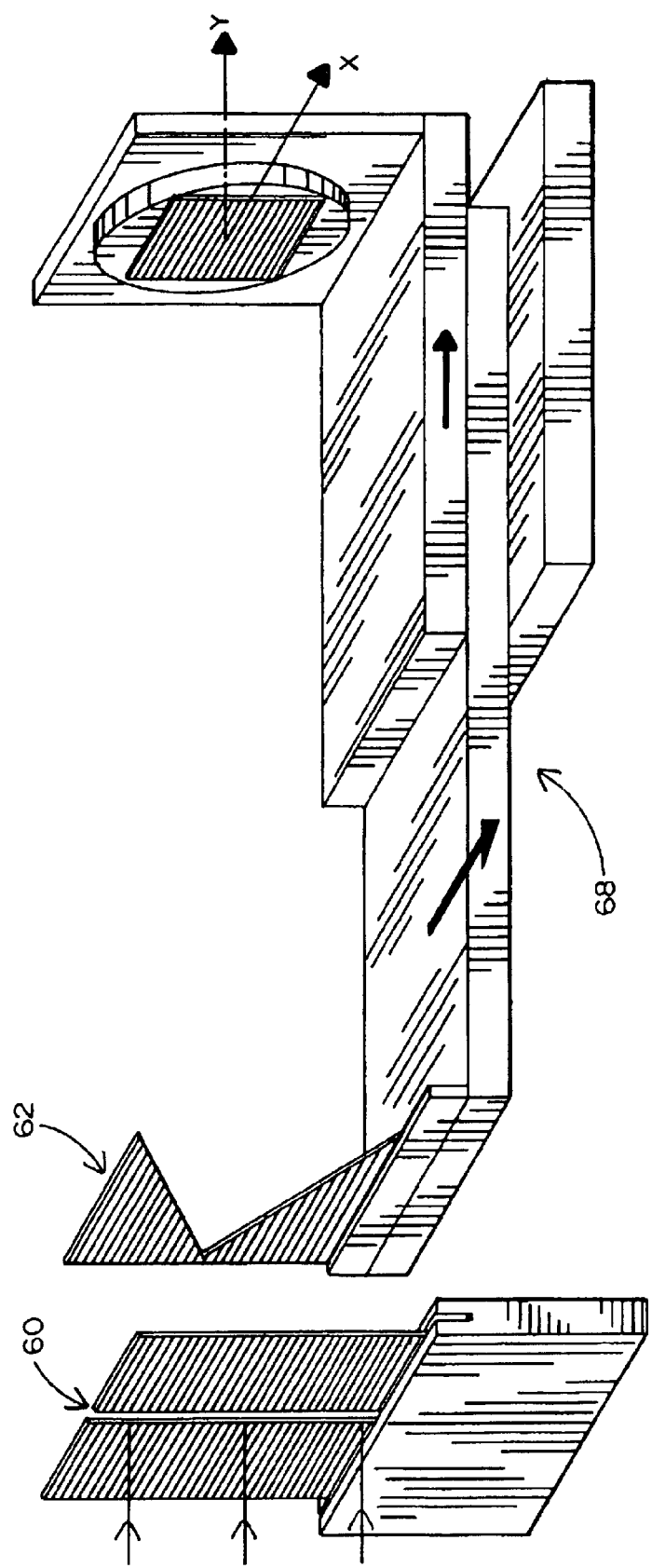

Fabrication of such diffusers may be carried out by employing the apparatus illustrated in FIGS. 20–23. FIG. 20 illustrates the overall apparatus which may be employed to fabricate seamless light shaping diffusers of both fixed and variable angles for use in a backlighting system of the invention. The apparatus comprises a laser and optics (M1, M2, SF, CYL) at selected relative positions (A, B) to provide a narrow, collimated slit beam of laser light at a vertical slit referred to as II block 60 in FIG. 21. This nominally 1 mm slit determines the minor angle of the diffuser by variation in slit size. A K-block 62 then is used to control the major angle of the diffuser and a V-block 64 is used to produce a seamless border. A rotary stage assembly 66 is used to produce circular segment variations while the underlying holder 68 provides controlled X and Y movement of the diffuser master. The configuration of FIG. 21 is used to produce variable circular (or waved) diffusers of the type shown in FIGS. 15–19. With removal of only K-block 62 in FIG. 22, the same apparatus is then used to fabricate masters for constant angle circular (or waved) diffusers such as that shown in FIG. 14. With removal of only V-block 64 and without operating the rotary stage 66 as shown in FIG. 23, the same apparatus is then used to fabricate rectangular diffuser masters with variable diffuser angle such as for those diffusers shown in FIGS. 11–13. Operation with only II-block 60 and without rotary stage 66 will result in fixed angle rectangular diffusers of the type shown in FIG. 10. The use of variable masks to control diffuser characteristics is further described in pending U.S. application Ser. No. 09/517,240 filed on Feb. 27, 2000 by the assignee hereof and which relates to the fabrication of variable diffusion masters for use in scanners. The content of that application is hereby incorporated herein by reference as if fully set forth herein.

Based upon the foregoing, it will be understood that the present invention pertains to a backlighting system configured for operation primarily with one or more LED light sources to achieve better brightness, greater homogeneous light distribution, improved durability and reduced power usage. Moreover, it will be also understood that the invention disclosed herein is unique in its simplicity of parts and structure. Unlike prior art backlighting systems, there is no requirement for cumbersome or complex structures for directing light from a light source into a light pipe or for assuring that the light enters the light pipe within certain maximum incident angles. Furthermore, it will be understood that although various alternative embodiments have been disclosed herein, further modification or additions may be readily perceived with the benefit of the teaching herein. By way of example, various components shown herein as separate components (i.e., reflector, LSD, light pipe, etc.) may be also integrated into a common structure such as by forming an LSD into the exit face of a light pipe or by coating the opposing surface of the light pipe with a mirror coating. Therefore, the scope of the invention is not limited to the illustrated embodiments, but only by the appended claims and their equivalents.

We claim:

1. A backlighting system comprising:
   at least one LED;
   a light pipe having an input surface for receiving light from said LED and a light bending surface for altering the direction of said light toward an exit face;
   a layer of reflective material positioned beneath said light bending surface of said light pipe;
   a variable diffusing angle light shaping diffuser positioned above said exit face of said light pipe for controlling the distribution of light from said exit face of said light pipe;
   said light shaping diffuser having a seamless diffuser pattern.

2. A backlighting system comprising:
   at least one LED;
   a light pipe having an input surface for receiving light from said LED and a light bending surface for altering the direction of said light toward an exit face;
   a layer of reflective material positioned beneath said light bending surface of said light pipe;
   a light shaping diffuser positioned above said exit face of said light pipe for controlling the distribution of light from said exit face of said light pipe;
   a foreshortened strip of light shaping diffuser positioned adjacent said input surface beneath said light pipe between said light bending surface and said layer of reflective material.

3. The backlighting system recited in claim 2 wherein said at least one LED is positioned substantially adjacent said input surface.

4. The backlighting system recited in claim 2 further comprising an optical film positioned above said light shaping diffuser for altering the variation in light intensity from said diffuser.

5. The backlighting system recited in claim 2 wherein said input surface comprises grooves of selected size and spacing.

6. The backlighting system recited in claim 2 wherein said light shaping diffuser comprises a constant diffusion angle over substantially its entire surface.

7. The backlighting system recited in claim 2 wherein said light shaping diffuser comprises a diffusion angle which varies an a selected manner over the surface of said diffuser.

8. The backlighting system recited in claim 7 wherein said light shaping diffuser is substantially rectangular in shape.

9. The backlighting system recited in claim 7 wherein said light shaping diffuser is substantially circular in shape.

10. The backlighting system recited in claim 9 wherein said diffusion angle varies along angular segments of said circular shape.

11. The backlighting system recited in claim 9 wherein said diffusion angle varies along radial segments of said circular shape.

12. A backlighting system for providing a substantially bright and homogenous background lighting in an electronic display; th system comprising:
    a light source including at least one light emitting diode;
    an optical waveguide positioned adjacent said light source and having a surface configured for altering the direction of light entering said waveguide from said light source for propagation through an exit surface; and
    a variable diffusing angle light shaping diffuser located in the path of light through said exit surface; said diffuser having a seamless diffuser pattern.

13. A backlighting system for providing a substantially bright and homogenous background lighting in an electronic display; the system comprising:
    a light source including at least one light emitting diode;
    an optical waveguide positioned adjacent said light source and having a surface configured for altering the direction of light entering said waveguide from said light source for propagation through an exit surface; and a light shaping diffuser located in the path of light through said exit surface;

a mirror positioned adjacent said waveguide opposite of said exit surface;

a foreshortened strip of light shaping diffuser positioned between said waveguide and said mirror adjacent said light source.

14. The backlighting system recited in claim 13 further comprising an optical film positioned above said light shaping diffuser for altering the variation in light intensity from said diffuser.

15. The backlighting system recited in claim 13 wherein said light shaping diffuser comprises a constant diffusion angle over substantially its entire surface.

16. The backlighting system recited in claim 13 wherein said light shaping diffuser comprises a diffusion angle which varies in a selected manner over the surface of said diffuser.

17. The backlighting system recited in claim 16 wherein said light shaping diffuser is substantially rectangular in shape.

18. The backlighting system recited in claim 16 wherein said light shaping diffuser is substantially circular in shape.

19. The backlighting system recited in claim 18 wherein said diffusion angle varies along angular segments of said circular shape.

20. The backlighting system recited in claim 18 wherein said diffusion angle varies along radial segments of said circular shape.

21. The backlighting system recited in claim 13 wherein said optical waveguide comprises an input surface having grooves of selected size and spacing.

22. The backlighting system recited in claim 13 wherein said waveguide comprises an input surface in the form of a light shaping diffuser.

23. A backlighting system comprising:

a light source;

an optical waveguide positioned adjacent the light source for receiving light therefrom and propagating the light through an exit face of said waveguide; and a variable diffusing angle light shaping diffuser positioned in the path of light from said waveguide exit face for controlling the distribution of light from said waveguide;

wherein said light shaping diffuser comprises a seamless diffuser pattern.

24. The backlighting system recited in claim 23 wherein diffuser pattern is circular.

25. The backlighting system recited in claim 23 wherein said diffuser is formed in said exit surface as an integral part of said waveguide.

* * * * *